United States Patent
Taki et al.

(10) Patent No.: US 6,722,598 B2
(45) Date of Patent: Apr. 20, 2004

(54) TAPE CASSETTE

(75) Inventors: Yoshitsugu Taki, Kanagawa (JP); Takao Hiramoto, Kanagawa (JP); Yoshihisa Takayama, Kanagawa (JP)

(73) Assignee: Sony Corporation (JP)

( * ) Notice: Subject to any disclaimer, the term of this patent is extended or adjusted under 35 U.S.C. 154(b) by 98 days.

(21) Appl. No.: 09/915,393

(22) Filed: Jul. 27, 2001

(65) Prior Publication Data

US 2001/0042806 A1 Nov. 22, 2001

Related U.S. Application Data

(62) Division of application No. 09/456,473, filed on Dec. 9, 1999, now Pat. No. 6,505,788.

(30) Foreign Application Priority Data

Dec. 11, 1998 (JP) .......................................... P10-353476

(51) Int. Cl.$^7$ .............................................. G11B 23/107
(52) U.S. Cl. ....................................... 242/348; 242/343
(58) Field of Search ................................ 242/348, 348.3

(56) References Cited

U.S. PATENT DOCUMENTS

| | | | | |
|---|---|---|---|---|
| 3,655,145 A | * | 4/1972 | Olsen ......................... | 242/348 |
| 3,744,736 A | | 7/1973 | Krühn ........................ | 242/195 |
| 3,797,776 A | | 3/1974 | Umeda et al. .............. | 242/188 |
| 3,797,777 A | | 3/1974 | Hosono et al. ............. | 242/187 |
| 3,809,218 A | | 5/1974 | Furst ........................... | 206/53 |
| 3,836,096 A | | 9/1974 | Fukushima et al. ......... | 242/197 |
| 4,168,811 A | | 9/1979 | Lewis ......................... | 242/195 |

FOREIGN PATENT DOCUMENTS

| | | |
|---|---|---|
| BE | 653 065 | 12/1964 |
| DE | 2 009 485 | 5/1971 |
| EP | 0143 592 A2 | 6/1985 |
| WO | WO 83/04453 | 12/1983 |
| WO | WO 98/44596 | 10/1998 |

OTHER PUBLICATIONS

IBM Technical Disclosure Bulletin; vol. 9, No. 12, May 1967; XP002139144 by D. H. Cronquist.

* cited by examiner

*Primary Examiner*—John Q. Nguyen
(74) *Attorney, Agent, or Firm*—Rader, Fishman & Grauer PLLC; Ronald P. Kananen

(57) ABSTRACT

A tape cassette including a cartridge and one tape reel provided in the cartridge, with a recording medium in the form of a tape being wound upon the tape reel. In the tape cassette, a leader tape that is more rigid than the recording medium in the form of a tape is connected to an unwinding end of the recording medium in the form of a tape; a toothed portion (a protrusion) is formed on at least a portion of both side edges of the leader tape; the tape reel has a flange on a top portion and on a bottom portion of a hub, and feed teeth (engaging portions) that engage the protrusions of the leader tape are formed on outer peripheral edges of the flanges. Rotation of the tape reel in one direction causes the engaging portions to feed the protrusions, whereby the leader tape is sent out from the cartridge. The tape cartridge of the invention can be reliably mounted to a recording/reproducing apparatus.

1 Claim, 14 Drawing Sheets

TAPE CASSETTE

This application is a division of Ser. No. 09/456,473, U.S. Pat. No. 6,505,788.

BACKGROUND OF THE INVENTION

1. Field of the Invention

The present invention relates to a novel tape cassette. More particularly, the present invention relates to a technology that ensures mounting of the tape cassette to a recording/reproducing apparatus.

More particularly, the present invention relates to a technology in which a recording medium in the form of a tape is wound upon a tape reel that is provided, and a leader tape with a rigidity that is higher than the rigidity of the recording medium in the form of a tape is connected to an unwinding end of the recording medium in the form of a tape, in order to send out the leader tape from a cartridge as a result of rotation of the tape reel in one direction and to reliably send out the leader tape.

To be more specific, the present invention relates to a technology for using one member for transmitting power between a reel table and a tape reel when the tape cassette is in use and for locking the tape reel when the tape cassette is not in use, in order to reduce the number of parts used.

2. Description of the Related Art

A one-reel tape cassette including one tape reel in a cartridge and a tape wound upon the tape reel is available.

When a conventional one-reel tape cassette is mounted to a recording/reproducing apparatus including a take-up reel, a draw-out tape that is resilient is paid out from the take-up reel towards the one-reel tape cassette, and one end of the draw-out tape and a leader tape connected to an end of a tape is brought into engagement, after which the draw-out tape is taken up by the take-up reel to draw out the tape from the cartridge.

In addition, when the one-reel tape cassette is mounted to a recording/reproducing apparatus to record and/or reproduce data, it is necessary to transmit power between the reel tape cassette and the reel table provided in the recording/reproducing apparatus. To achieve this, there has been conventionally provided, for example, a press-contacting means for press-contacting the lower surface of the tape reel and the upper surface of the reel table.

When the table reel rotates at random when the tape cassette is not in use, the winding of the tape gets disturbed. This may cause the tape to get wrinkled or entangled, and thus damage it. To prevent the tape reel from rotating at random, it is necessary to keep the tape reel locked. To achieve this, there has been conventionally provided a biasing means for engaging a lock means provided at the tape reel and a lock means provided at the cartridge.

However, in the above-described conventional one-reel tape cassette, the draw-out tape is paid out from the take-up reel side and one end of the draw-out tape is brought into engagement with the leader tape in order to draw out a tape, making the mechanism thereof complicated, and making it very likely for engagement between the end of the draw-out tape and the leader tape to be unsuccessful. In addition, the complicated mechanism requires a larger number of operating parts when moving the one-reel tape cassette into and from the recording/reproducing apparatus, making it less durable.

In addition, in the above-described conventional one-reel tape cassette, the press-contacting means for press-contacting the lower surface of the tape reel and the upper surface of the reel table and the biasing means used for engaging the lock means provided at the tape reel and the lock means provided at the cartridge are provided separately. This has resulted in problems such as increased number of parts, higher costs, and limitations in the extent to which the cassette can be made small due to the extra space required for setting the press-contacting means and the biasing means. When a larger number of parts is used, it is more likely for defects to occur in the cassette.

SUMMARY OF THE INVENTION

Accordingly, in order to overcome the above-described problems, it is an object of the present invention to provide a tape cassette which requires fewer parts and which allows a tape to be reliably sent out using a simple mechanism.

To this end, according to a first aspect of the present invention, there is provided a tape cartridge wherein a leader tape that is more rigid than the recording medium in the form of a tape is connected to an unwinding end of the recording medium in the form of a tape;

wherein a protrusion is formed on at least a portion of both side edges of the leader tape;

wherein the tape reel has a flange on a top portion and on a bottom portion of a hub, and wherein engaging portions that engage the protrusions of the leader tape are formed on outer peripheral edges of the flanges; and wherein rotation of the tape reel in one direction causes the engaging portions to feed the protrusions, whereby the leader tape is sent out from the cartridge.

In this case, the leader tape can be sent out from the cartridge only by the rotational drive power of the tape reel. Therefore, the tape cassette has a far simpler structure than the conventional structure in which the tape is drawn out from the cartridge by a draw-out tape.

According to a second aspect of the present invention, there is provided a tape cassette wherein a leader tape guide wall is formed along substantially an entire periphery of the tape reel excluding a portion thereof located in correspondence with a tape draw-out opening so as to enclose at least a portion of the tape reel in an axial direction thereof.

In this case, the tape reel is rotated in the direction in which the tape is paid out to bring the leader tape into contact with the guide wall. Due to the rigidity thereof, the rotational force of the tape reel is used to pay out the leader tape, causing the leader tape to be reliably paid out from the cartridge.

According to a third aspect of the present invention, there is provided a tape cassette, wherein a tape guide for guiding the tape is provided at a location corresponding to a location of a tape draw-out opening, with a protruding stopper being provided at a surface of the tape guide that comes into contact with the tape; and wherein a stopping hole is formed in the leader tape, in which when the leader tape is rewound into the cartridge, the stopping hole comes into engagement with the stopper of the tape guide in order to prevent the leader tape from being drawn into the cartridge excessively.

In this case, the leader tape is prevented from being excessively drawn into the cartridge, so that one end of the leader tape is disposed in position. Therefore, the leader tape can be reliably paid out by rotation of the tape reel.

According to a fourth aspect of the present invention, there is provided a tape cassette wherein a leader tape that is more rigid than the recording medium in the form of a tape is connected to an unwinding end of the recording medium in the form of a tape, and rotation of the tape reel in one direction causes the leader tape to be sent out from the cartridge; and wherein a tape guide is provided near a tape draw-out opening in the cartridge in order to guide an end portion of the leader tape being pushed out towards the tape draw-out opening by the rotation of the tape reel.

In this case, even when one end of the leader tape has been deeply drawn into the cartridge, the rotation of the tape reel in one direction causes the one end of the leader tape to be guided by the tape guide towards the tape draw-out opening. Therefore, it is possible to reliably send out the leader tape.

According to a fifth aspect of the present invention, there is provided a tape cassette comprising:

sliding restricting means, provided at the lower surface of the tape reel, for restricting sliding in a direction of a surface of the tape reel as a result of press-contacting the tape reel against the reel table;

biasing means for biasing the tape reel in a direction in which the tape reel is press-contacted against the reel table;

means for being locked, formed in the lower surface of the tape reel; and locking means, disposed at an inside bottom surface of the cartridge, for engaging the means for being locked;

wherein when the tape cartridge is not used, the means for being locked and the locking means are made to engage each other by the biasing means, and wherein when the tape cartridge is used, the reel table is press-contacted against the sliding restricting means to cause the lower surface of the tape reel to separate from the inside bottom surface of the cartridge, whereby the means for being locked and the locking means are disengaged from each other.

In this case, the biasing means used as a member for transmitting power between the reel table and the tape reel when the tape cassette is used can also be used as a member for locking the tape reel when it is not used. Therefore, the number of parts used can be reduced.

DESCRIPTION OF THE PREFERRED EMBODIMENT

Hereunder, a description will now be given of an embodiment of the tape cassette of the present invention with reference to the attached drawings. In the embodiment illustrated in the figures, a data-storage tape cassette is used.

Figure 1:
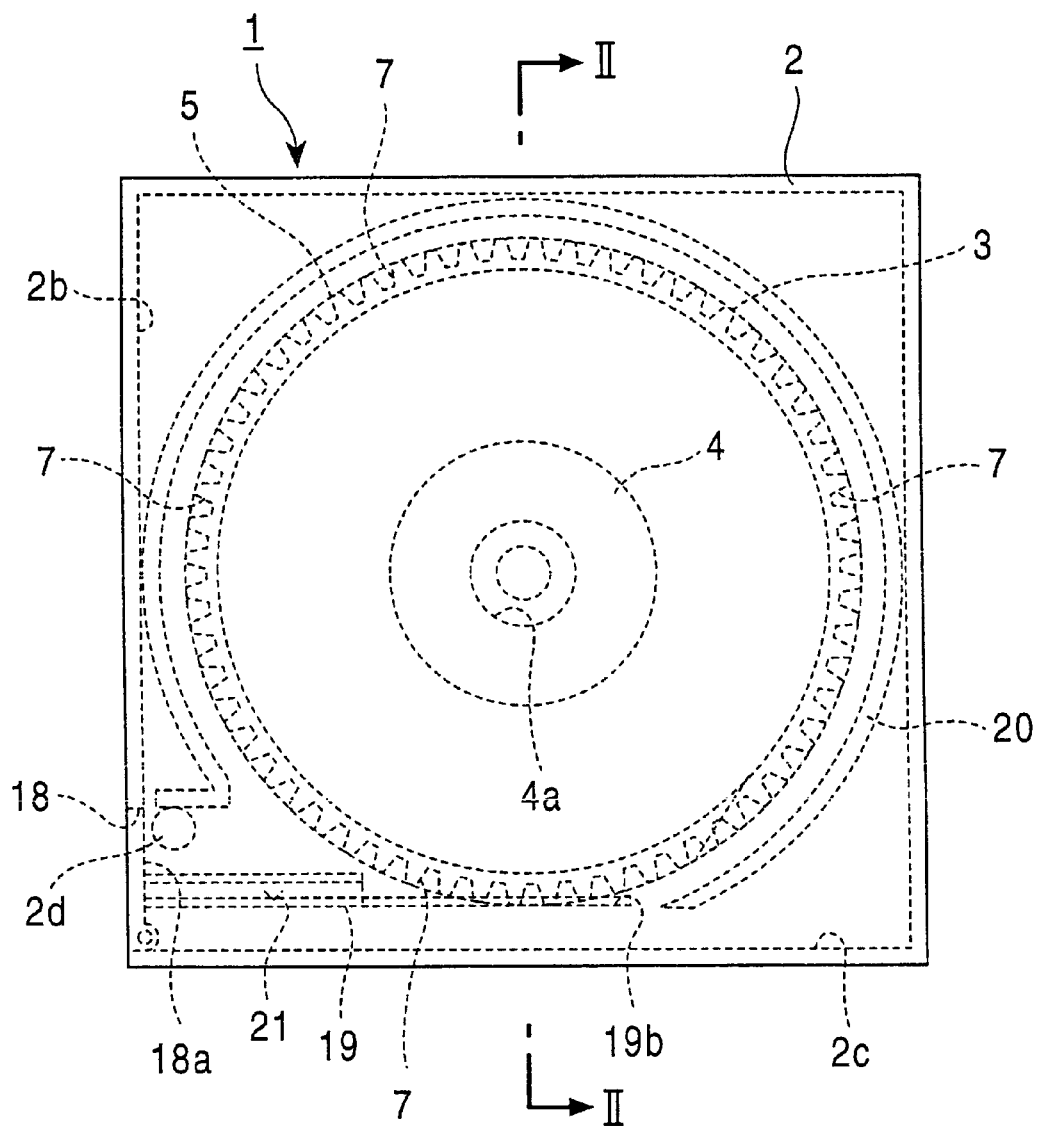
FIG. 1, along with FIGS. 2 to 7, illustrates an embodiment of the tape cassette of the present invention, and is a plan view thereof.

As shown in FIG. 1, a one-reel tape cassette 1 includes a flat, rectangular-box-shaped cartridge 2.

A tape reel 3 is rotatably accommodated in the cartridge 2. The tape reel 3 has a cylindrical hub 4 and disk-shaped flanges 5 and 6 that are integrally formed with the top and bottom portions of the hub 4. Stepped portions are formed along the entire outer peripheral edges of the top and bottom flanges 5 and 6. Feed teeth 7 are formed at the bottom surface of the stepped portion of the top flange 5 so as to be arranged in a peripheral direction of the top flange 5. Feed teeth 8 are formed at the top surface of the stepped portion of the bottom flange 6 so as to be arranged in a peripheral direction of the bottom flange 6. A portion 9, that is, a portion between the top and the bottom flanges 5 and 6 located inwardly of the stepped portions thereof corresponds to a tape-winding portion used to wind a recording medium thereupon, such as a magnetic tape, that is, a tape 10. Portions 11 of the stepped portions correspond to reader-tape winding portions used to wind a leader tape 12 thereupon.

Figure 2:
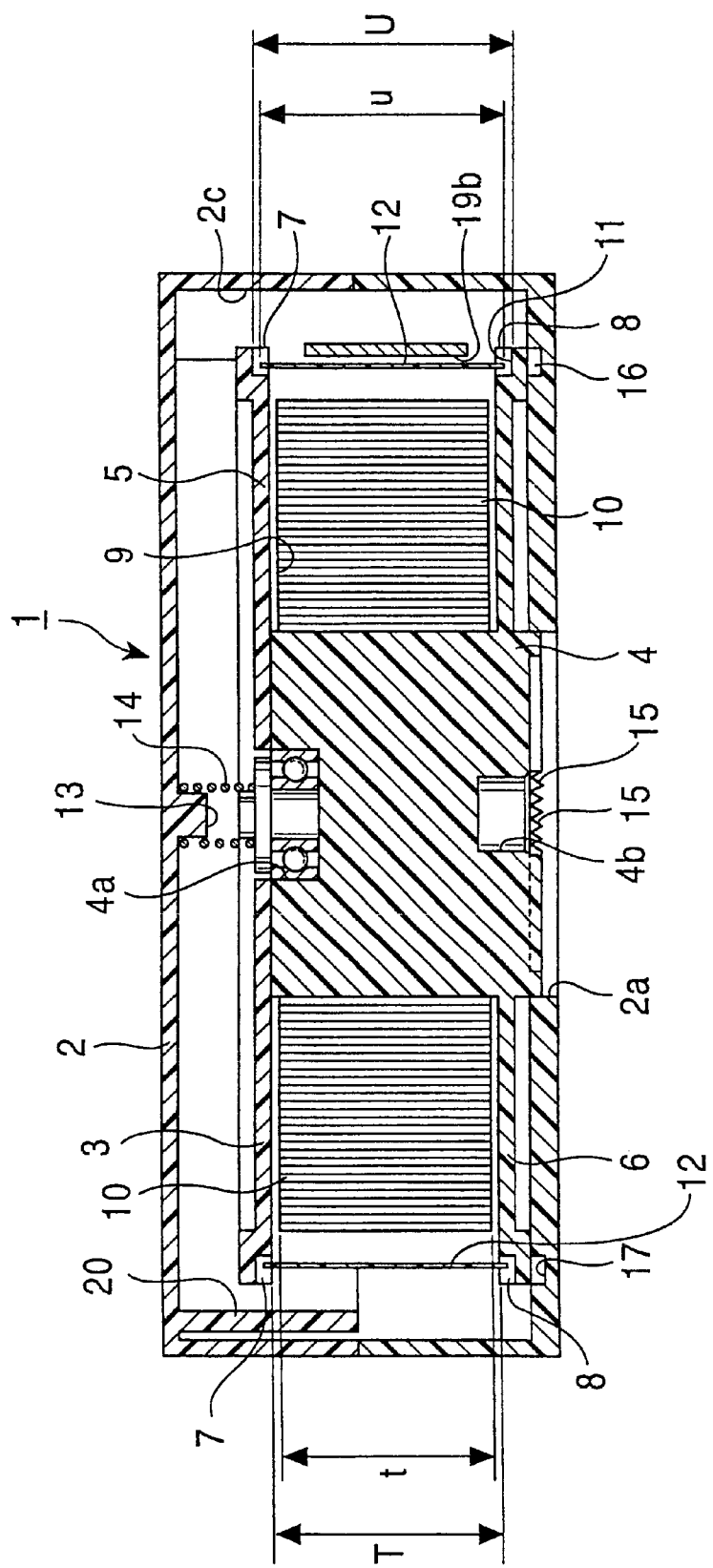
FIG. 2 is a vertical sectional view thereof.
Figure 3:
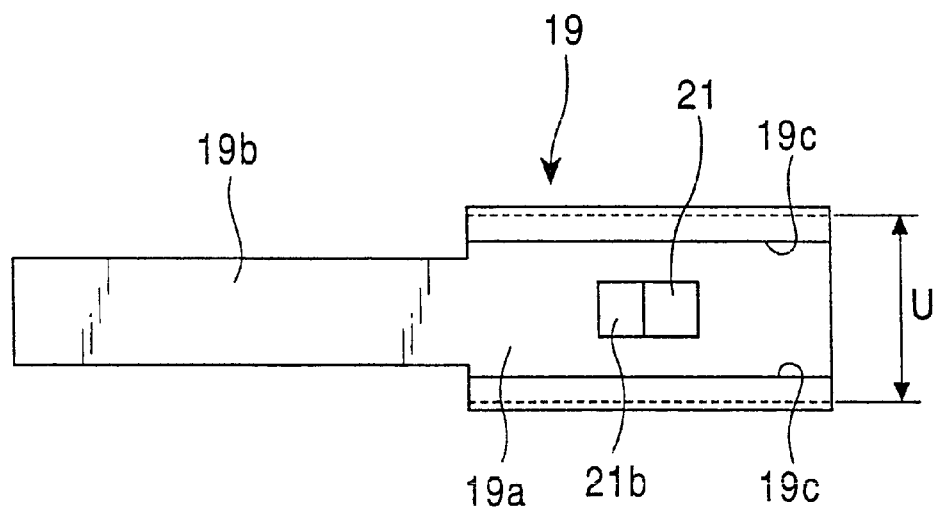
FIG. 3, along with FIGS. 4 to 6, illustrates a tape guide, and is a front view thereof.
Figure 4:
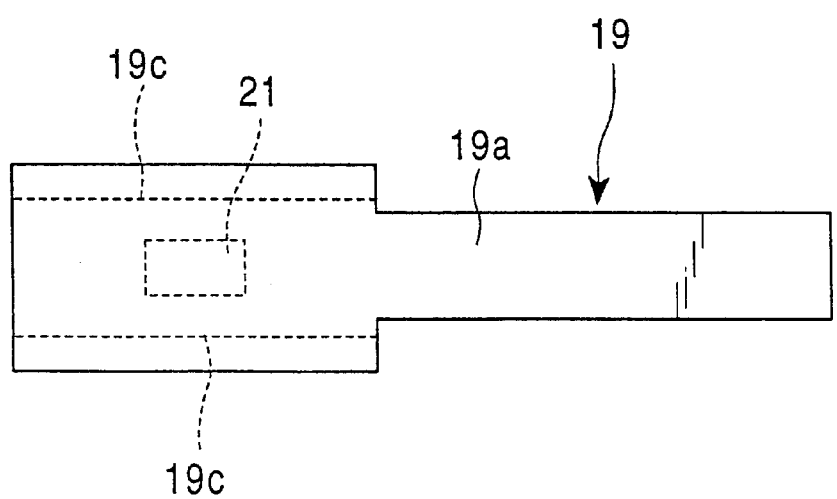
FIG. 4 is a rear view thereof.
Figure 5:
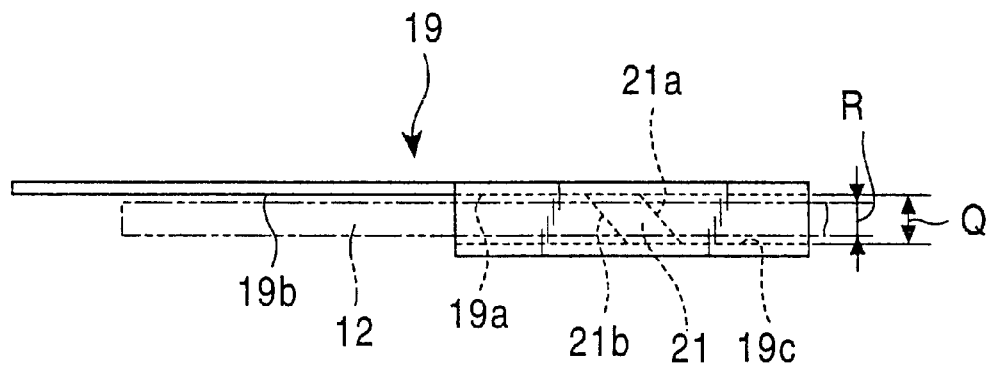
FIG. 5 is a plan view thereof.
Figure 6:
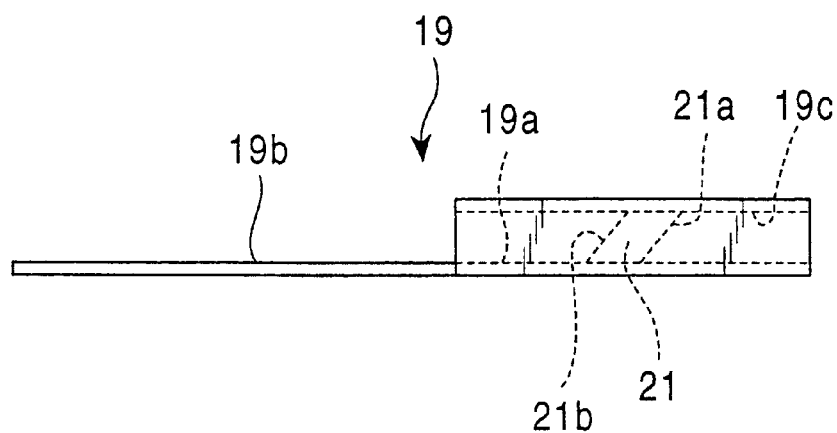
FIG. 6 is a bottom view thereof.

As shown in FIG. 2, vertical width T of the tape-winding portion 9 is smaller than vertical width U of the reader-tape winding portion 11, and is slightly larger than width t of the tape 10. The vertical width U of the reader-tape winding portion 11 is slightly larger than width u of a portion of the leader tape 12 not including toothless portions described later.

A recess 4a is formed in the top end surface of the hub 4, and a protrusion 13 is formed in a location of the bottom surface of the top wall of the cartridge 2 that corresponds to the location of the recess 4a. A compression coil spring 14 is compressed between the recess 4a and the top wall of the cartridge 2, with the top end of the compression coil spring 14 being externally fitted to the protrusion 13. This causes the tape reel 3 to be biased downward.

A hole 4b is formed in the center of the bottom surface of the hub 4, and engaging protruding linear portions 15 extending radially from the hole 4b as a center are also formed at the bottom surface of the hub 4.

A reel-table insertion opening 2a is formed in the bottom wall of the cartridge 2 in order to insert a reel table (described later) into the cartridge 2.

Lock teeth 16 are formed at the bottom surface of the outer peripheral edge of the bottom flange 6 so as to be arranged in a peripheral direction of the bottom flange 6, and lock recesses 17 with which the lock teeth 16 engage are formed in locations of the bottom wall of the cartridge 2 that oppose the lock teeth 16. The lock teeth 16 may be formed into the shape of saw teeth or a trapezoidal shape, so that they do not have to be formed with the shape shown in FIG. 2.

A tape draw-out opening 18 is formed in an end of a side wall 2b of the cartridge 2, and can be covered or uncovered by a rotatable lid 18a.

A tape guide 19 is formed near the tape draw-out opening 18 in the cartridge 2. It is formed near a side wall 2c formed near the tape draw-out opening 18, is almost parallel to the side wall 2c, and has a main surface 19a that is a surface facing the side wall 2c. One end of the main surface 19a is located near the tape draw-out opening 18, while the other end of the main surface 19a extends towards a side opposite to the tape draw-out opening 18 to a location slightly separated from a location corresponding to the center portion of the side wall 2c. To a portion towards the other end slightly beyond the center portion extends a portion 19b (hereinafter referred to as "tape press-contacting surface") that is positioned in the tape-winding portion 11 of the tape reel 3. Recessed linear guide portions 19c and 19c whose open portions oppose each other in the vertical direction are formed at the tape-reel-3 facing sides of the top and the bottom side edges of portions of the main surface 19a extending from a tape draw-out side end of the tape press-contacting surface 19b to another end. Vertical width U of the main surface 19a is slightly larger than the vertical width u of the leader tape 12. Gap T between the open end of the upper recessed linear guide portion 19c and the open end of the lower recessed linear guide portion 19c is slightly larger than the vertical width t of the tape 10.

A protruding stopper 21 (see FIGS. 3 to 6) is formed about midway between the recessed linear guide portions 19c and 19c formed at the main surface 19a of the tape guide 19, as viewed in directions of the height and length of the tape guide 19. The stopper 21 is inclined so that an end thereof is displaced towards the tape draw-out opening 18 side. A surface 21a of the stopper 21 at the tape draw-out opening 18 side is formed as a stopping surface, while a surface 21b opposing the stopping surface 21a is formed as a sliding surface.

A reader-tape guide wall 20 is formed right around the outer side of the reader-tape winding portion 11 of the tape reel 3 in the cartridge 2 so as to surround it. The reader-tape guide wall 20 is provided so as to hang down from the top wall of the cartridge 2, and is formed so as to enclose substantially a half of the vertical width of the reader-tape winding portion 11. The reader-tape guide wall 20 extends around almost the entire periphery, with one end thereof being located close to one end of the tape guide 19, and the other end thereof terminating near the other end of the tape guide 19.

A tape 10 is wound on the tape-winding portion 9 formed at the hub 4 of the tape reel 3, and the leader tape 12 is connected to an end of the tape 10 and wound upon the leader-tape winding portion 11. When the tapes 10 and 12 have been completely wound up in the cartridge 2, a stopping hole 12a formed in an end of the leader tape 12 engages the stopping surface 21a of the stopper 21 of the tape guide 19 so as to prevent further winding-up operations in the cartridge 2. Height Q of the stopper 21 is either equal to or greater than thickness R of the leader tape 12 (that is, Q ( R) to ensure engagement of the stopper 21 and the stopping hole 12a.

In particular, when the leader tape 12 has high rigidity and resiliency, and a portion of the leader tape 12 other than the portion in which the stopping hole 12a is formed passes by the portion where the stopper 21 is formed, the center portion of the leader tape 12 in a vertical direction flexes so as to protrude towards the tape reel 3, thus increasing the resiliency thereof. Therefore, when the stopping hole 12a opposes the stopper 21, the leader tape 12 straightens, causing the stopping hole 12a to reliably engage the stopper 21.

In the cartridge 2, a tape guide pin 2d is formed near the tape-draw opening 18 side end of the tape guide 19.

The width t of the tape is slightly smaller than the vertical width T of the tape-winding portion 9 of the tape reel 3; and the width u of the leader tape 12 is larger than the vertical width T of the tape-winding portion 9, and is slightly smaller than the vertical width U of the reader-tape winding portion 11. The leader tape 12 is formed of, for example, polycarbonate resin, ABS (acrylonitrile butadiene styrene) resin, or vinyl chloride, and is more rigid and resilient than the tape 10.

Figure 7:
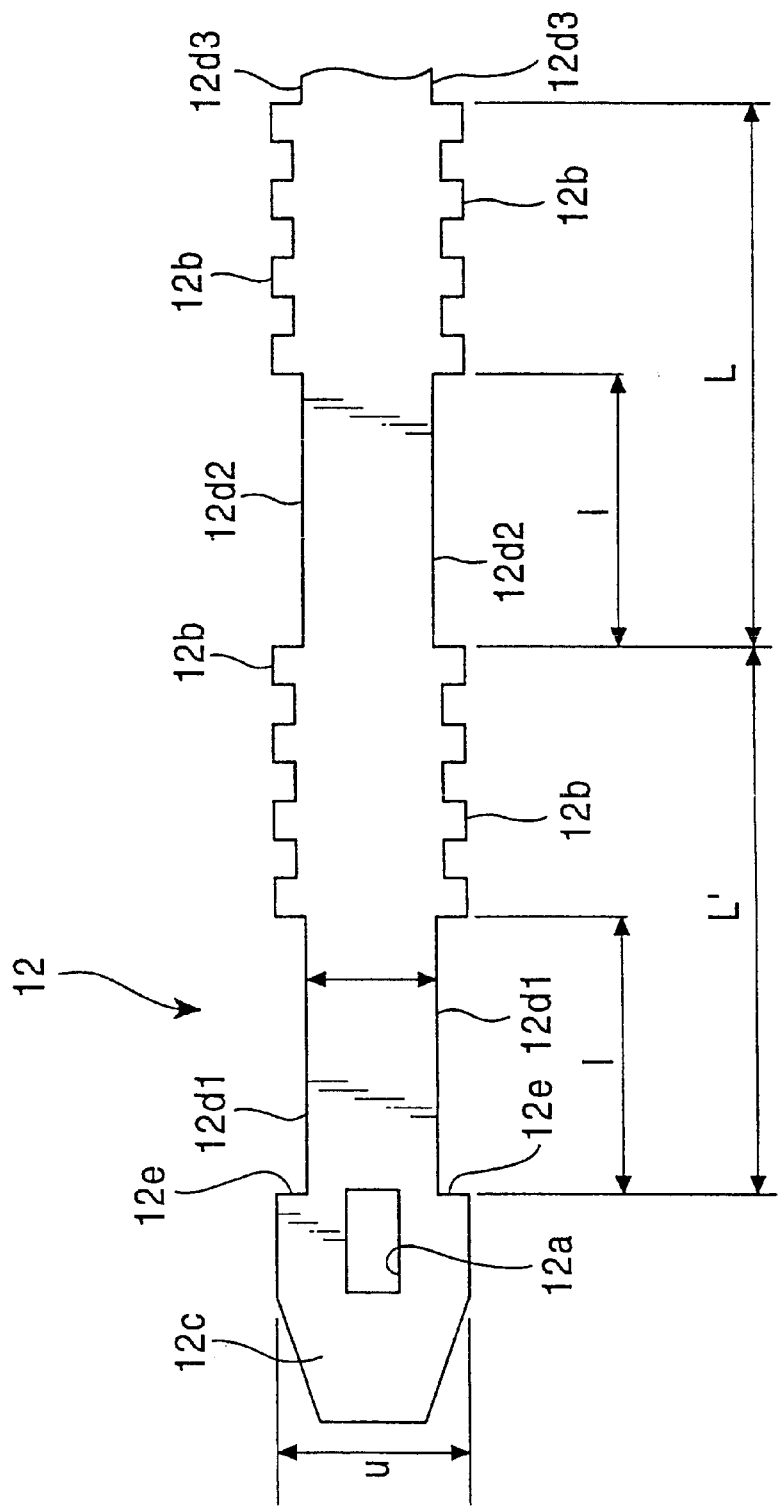
FIG. 7 is a front view of a reading tape.

As shown in FIG. 7, toothed portions (or protrusions) 12b are formed on the top and the bottom side edges of the leader tape 12, and an end portion 12c of the leader tape 12 tapers to a smaller width so as to be shaped like a triangle. Toothless portions 12d are formed at constant intervals between the toothed portions 12b. The formation of the toothless portions 12d at the end portion 12c of the leader tape 12 results in the formation of engaging edges 12e and 12e at the top and the bottom portions of the back side of the end portion 12c.

With the leader tape 12 wound on the reader-tape winding portion 11, the feed teeth 7 formed on the top flange 5 and the feed teeth 8 formed on the bottom flange 6 engage the toothed portions 12b of the leader tape 12.

In the case where the above-described one-reel tape cassette 1 is not being used, when the tape reel 3 is biased downward by the compression coil spring 14, the bottom flange 6 is pushed against the bottom inside surface of the cartridge 2, causing the lock teeth 16, formed in the outer peripheral edge of the bottom surface of the bottom flange 6, to engage their respective lock recesses 17 formed in the bottom inside surface of the cartridge 2, whereby the tape reel 3 is prevented from rotating at random.

A description will now be given of a recording/reproducing apparatus 22 used with the above-described one-reel tape cassette 1, with reference to FIGS. 8 to 16.

Figure 8:
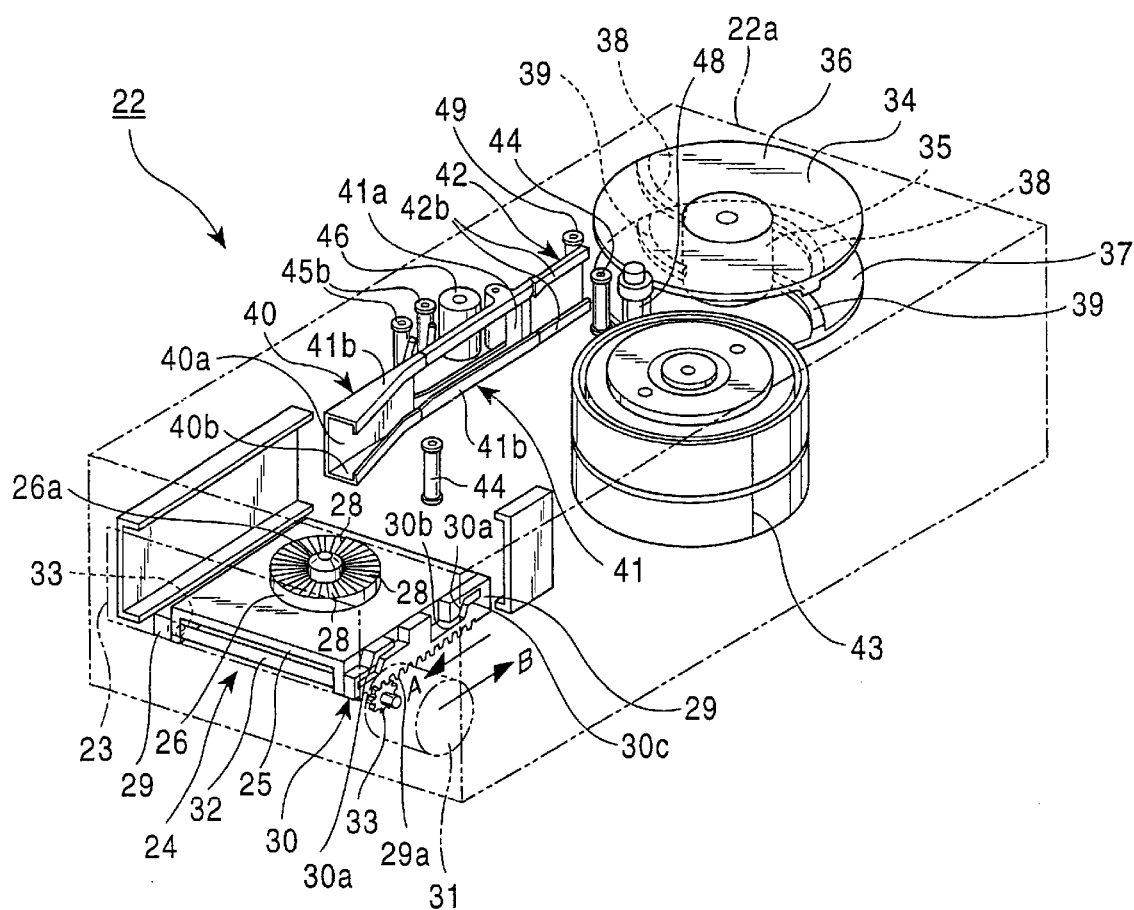
FIG. 8, along with FIGS. 9 to 16, illustrates a recording/reproducing apparatus used with the one-reel tape cassette in accordance with the present invention, and is a schematic perspective view thereof.
Figure 9:
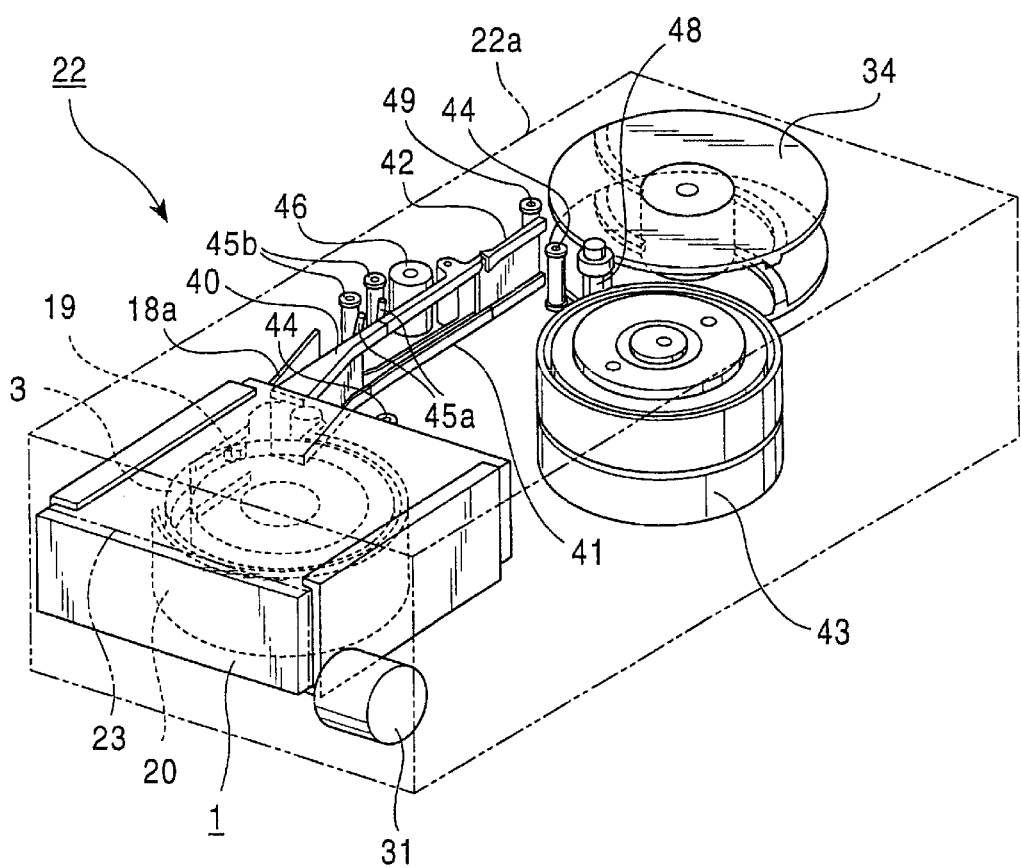
FIG. 9 is a schematic perspective view of a state in which the one-reel tape cassette is mounted to the recording/reproducing apparatus.

As shown in FIG. 8, a cassette insertion-and-removal opening 23 is formed in one side of a housing 22a of the recording/reproducing apparatus 22. The above-described one-reel tape cassette 1 is inserted into and removed from the cassette insertion-and-removal opening 23.

A cassette-mounting portion 24 is formed adjacent to the cassette insertion-and-removal opening 23 in a chassis that is not shown in the housing 22a. A reel table base 25 is provided in the cassette-mounting portion 24 so that it can be freely raised and lowered. A reel table 26 is supported by the reel table base 25, and is rotated forward or backward by a reel table motor 27. A protruding reel engaging shaft 26a is provided at the center of the top surface of the reel table 26. Engaging protruding linear portions 28 are provided on the top surface of the reel table 26 so as to extend radially from the reel engaging shaft 26a as a center. The engaging protruding linear portions 28 are formed so that they can engage the engaging protruding linear portions 15 of the tape reel 3. A clutch mechanism that is not shown is inserted between the reel table 26 and the reel table motor 27. When a load equal to or greater than a certain load is exerted onto the clutch mechanism, sliding occurs between the reel table 26 and the reel table motor 27.

As mentioned above, the reel table base 25 can be freely raised and lowered. Slide cams 29 and 29 are formed on two opposite sides of the reel table base 25 so as to be movable in the directions of arrows A and B of FIG. 8. Two cam slits 30 and 30 that are separated in a direction of movement of the slide cams 29 are formed in each slide cam 29. Each cam slit 30 is defined by an inclined portion 30a; a lower horizontal portion 30b formed continuously with the lower end of its associated inclined portion 30a, and a upper horizontal portion 30c formed continuously with the upper end of its associated inclined portion 30a. Racks 29a and 29a are formed at the bottom surfaces of the slide cams 29 and 29, respectively.

Two pinions 33 and 33 that are rotated by a raising-and-lowering motor 31 and coupled to each other by a synchronous shaft 32 are provided so as to engage racks 29a and 29a of the slide cams 29 and 29.

Two protruding engaging pins that is not shown separated from each other in the direction of movement of the slide cams 29 and 29 are provided at sides of the reel table base 25 opposing the slide cams 29 and 29, and can slidably engage the slits 30 in the slide cams 29 and 29. The reel table motor 27 is supported by the reel table base 25.

When the raising-and-lowering motor 31 is driven, the pinions 33 and 33 rotate. The rotation of the pinions 33 and 33 causes the racks 29a and 29a to move forward, resulting in movement of the slide cams 29 and 29. With the slide cams 29 and 29 being positioned at end-of-movement locations in the direction of arrow B, the engaging pins provided at the reel table base 25 engage the lower horizontal portions 30b defining the cam slits 30, so that the reel table base 25 is at its lowest end of its range of movement. From this state, when the slide cams 29 and 29 move in the direction of arrow A, the engaging pins provided at the reel table base 25 moves to the inclined portions 30a defining the cam slits 30 and arrives at the upper side horizontal portions 30c, whereby the reel table base 25 is at the highest end of its range of movement.

When the one-reel tape cassette 1 is inserted into the recording/reproducing apparatus 22 from the cassette insertion-and-removal opening 23, the reel table base 25 moves upward as a result of driving the raising-and-lowering motor 31, causing the reel table 26 to be inserted into the cartridge 2 from the reel-table insertion opening 2a, so that the top surface of the reel table 26 comes into contact with the bottom surface of the hub 4 and is pushed upward. Therefore, the tape reel 3 moves slightly upward against the biasing force of the compression coil spring 14. When the tape reel 3 is moved slightly upward, the lock teeth 16 of the tape reel 3 disengage the lock recesses 17 in the cartridge 2, so that the tape reel 3 gets unlocked (see FIG. 11). At the same time, the table reel 3 is press-contacted against the reel table 26 by the compression coil spring 14, and the reel engaging shaft 26a on the reel table 26 engages the center hole 4b in the bottom surface of the hub 4 to center the tape reel 3. In addition, the engaging protruding linear portions 15 formed at the bottom surface of the hub 4 and the engaging protruding linear portions 28 formed on the top surface of the reel table 26 engage one another, whereby the reel table 26 and the tape reel 3 are connected together so as that they can rotate integrally.

Means for connecting the tape reel 3 and the reel table 26 so that they can rotate integrally are not limited to engagement of the aforementioned engaging protruding linear portions 15 and the aforementioned engaging protruding linear portions 28. In another means of connection, the engaging protruding linear portions 15 or 28 may be replaced with a surface having a high coefficient of friction.

In still another means for connecting the tape reel 3 and the reel table 26 so that they can rotate integrally, abutting surfaces of the tape reel 3 and the reel table 26 are formed with a high coefficient of friction, and these two surfaces are press-contacted against each other.

A take-up reel 34 is disposed opposite to the cassette-mounting portion 24 so as to be rotatable by a motor that is not shown. The take-up reel 34 has a cylindrical hub 35 and flanges 36 and 37 protruding from the top and bottom ends of the hub 35. Hooks 38 and 38 are disposed 180 degrees apart at the bottom surface of the top flange 36. The hooks 38 are protruding linear portions, which extend in the form of an arc of a recess from the inner peripheral edge to the outer peripheral edge of the flange 36, that is, in the direction of arrow C in FIG. 10. At the top surface of the bottom flange 37, hooks 39 and 39 similar to the hooks 38 and 38 are disposed in correspondence with the hooks 38 and 38. The size of the gap between the bottom surfaces of the hooks 38 and 38 and the top surfaces of the hooks 39 and 39 are approximately equal to the vertical width T of the tape-winding portion 9 provided at the tape reel 3; and the size of the gap between the flanges 36 and 37 is approximately equal to the vertical width U of the reader-tape winding portion 11 provided at the tape reel 3.

Lengths 1 of the toothless portions 12d of the leader tape 12 are required to allow it to escape from the hooks 38 and 38 and 39 and 39 of the take-up reel 34 during rewinding operations, and must be equal to or greater than the length measured from an end 38a to a base end 38b of each hook 38 and the length measured from an end 39a to a base end 39b of each hook 39. Lengths L' measured from the engaging edges 12e to ends of second toothless portions 12d2 are required to prevent the next hooks 38 and 39 from colliding with the toothed portions 12b after the engaging edges 12e and 12e have engaged the present hooks 38 and 39, and must satisfy the relationship: l<L'>½ (D (where D is the diameter of the hub 35). Pitches L measured from the second toothless portions 12d2 to the toothless portions 12d formed beyond them are equal to or slightly less than ½ (D to prevent collision of the toothed portions 12b with the hooks 38 and 38 and 39 and 39. In other words, L (½ (D (however, L>½ (D is included).

The take-up reel 34 and the tape reel 3 of the one-reel tape cassette 1, mounted to the recording/reproducing apparatus 22, are disposed at the same height.

Three reader-tape guides 40, 41, and 42 are disposed between the tape draw-out opening 18 in the one-reel tape cassette 1 and the take-up reel 34. The tape guides 40 and 42 on both sides of the tape guide 41 are stationary guides, whereas the intermediate tape guide 41 disposed between the two tape guides 40 and 42 are rotatably provided.

The reader-tape guide 40 disposed near the tape draw-out opening 18 of the one-reel tape cassette 1 includes a main surface 40a that extends vertically, and recessed linear guide portions 40b and 40b whose open portions oppose each other in a vertical direction at the top and bottom side edges of the side of the main surface 40a that faces a head drum that is described later. The recessed linear guide portions 40b and 40b are formed such that their widths become larger with decreasing distance from the tape draw-out opening 18 in the one-reel tape cassette 1, so that the end portion 12c of the leader tape 12 that has been paid out from the tape draw-out opening 18 can be easily inserted between the recessed linear guide portions 40b and 40b.

Vertical width U of the main surface 40a is slightly larger than the vertical width u of the leader tape 12, and gap T between the open end of the top recessed linear guide portion 40b and the open end of the bottom recessed linear guide portion 40b is slightly larger than the width t of the tape 10.

The reader-tape guide 42 disposed close to the take-up reel 34 includes a main surface 42a that extends in a vertical direction and recessed linear guide portions 42b and 42b whose open portions oppose each other in the vertical direction at the top and bottom side edges of a side of the main surface 42a that opposes the head drum that is described later. End portions of the recessed linear guide portions 42b and 42b at the intermediate tape guide 41 side are formed so that their widths become larger towards the ends of the guide portions 42b and 42b, allowing the end portion 12c of the leader tape 12 that has been paid out from the intermediate tape guide 41 to be easily inserted between the recessed linear guide portions 42b and 42b.

Vertical width U of the main surface 42a is slightly larger than the vertical width u of the leader tape 12, and gap T between the open end of the top recessed linear guide portion 42b and the open end of the bottom recessed linear guide portion 42b is slightly larger than the width t of the tape 10.

The intermediate tape guide 41 includes a main surface 41a that extends in a vertical direction and recessed linear guide portions 41b and 41b whose open portions oppose each other in the vertical direction at the top and the bottom side edges of a side of the main surface 41a that opposes the head drum that is described later. End portions of the recessed linear guide portions 41b and 41b at the one-reel tape cassette 1 side are formed so that their widths become larger towards the ends of the recessed linear guide portions 41b and 41b, allowing the end portion 12c of the leader tape 12 that has been paid out from the tape guide 40a t the one-reel tape cassette 1 side to be easily inserted between the recessed linear guide portions 41b and 41b.

Vertical width U of the main surface 41a is slightly larger than the vertical width u of the leader tape 12, and gap T between the open end of the top recessed linear guide portion 41b and the open end of the bottom recessed linear guide portion 41b is slightly larger than the width t of the tape 10.

The intermediate guide 41 is rotatably supported by the chassis that is not shown, at a location slightly towards the take-up reel 34 from the center of the intermediate guide 41 in the lengthwise direction thereof. A cutout 41d is formed in a portion of the main surface 41a at the cassette-mounting portion 24 side from a fulcrum 41c. Vertical width T of the cutout 41d is slightly larger than the width t of the tape 10.

A head drum 43 is disposed between the cassette-mounting portion 24 of a chassis that is not shown and the take-up reel 34, and is disposed at a side of surfaces where the recessed linear guide portions 40b and 40b of the leader tape guide 40, the recessed linear guide portions 41b and 41b of the leader tape guide 41, and the recessed linear guide portions 42b and 42b of the leader tape guide 42 are formed (these surfaces are hereinafter referred to as "front surfaces," and the opposite surfaces are hereinafter referred to as "back surfaces") A rotary head that is not shown is provided at the head drum.

Stationary tape guides 44 and 44 are disposed near the front surfaces of the leader tape guides 40 and 42.

Draw-out guides 45 and 45 and a pinch roller 46 are disposed at the back surface side of a portion of the intermediate tape guide 41 where a cutout portion 41d is formed. The draw-out guides 45 and 45 each include inclined guide portions 45a and 45a and rotary guide portions 45b and 45b.

Figure 10:
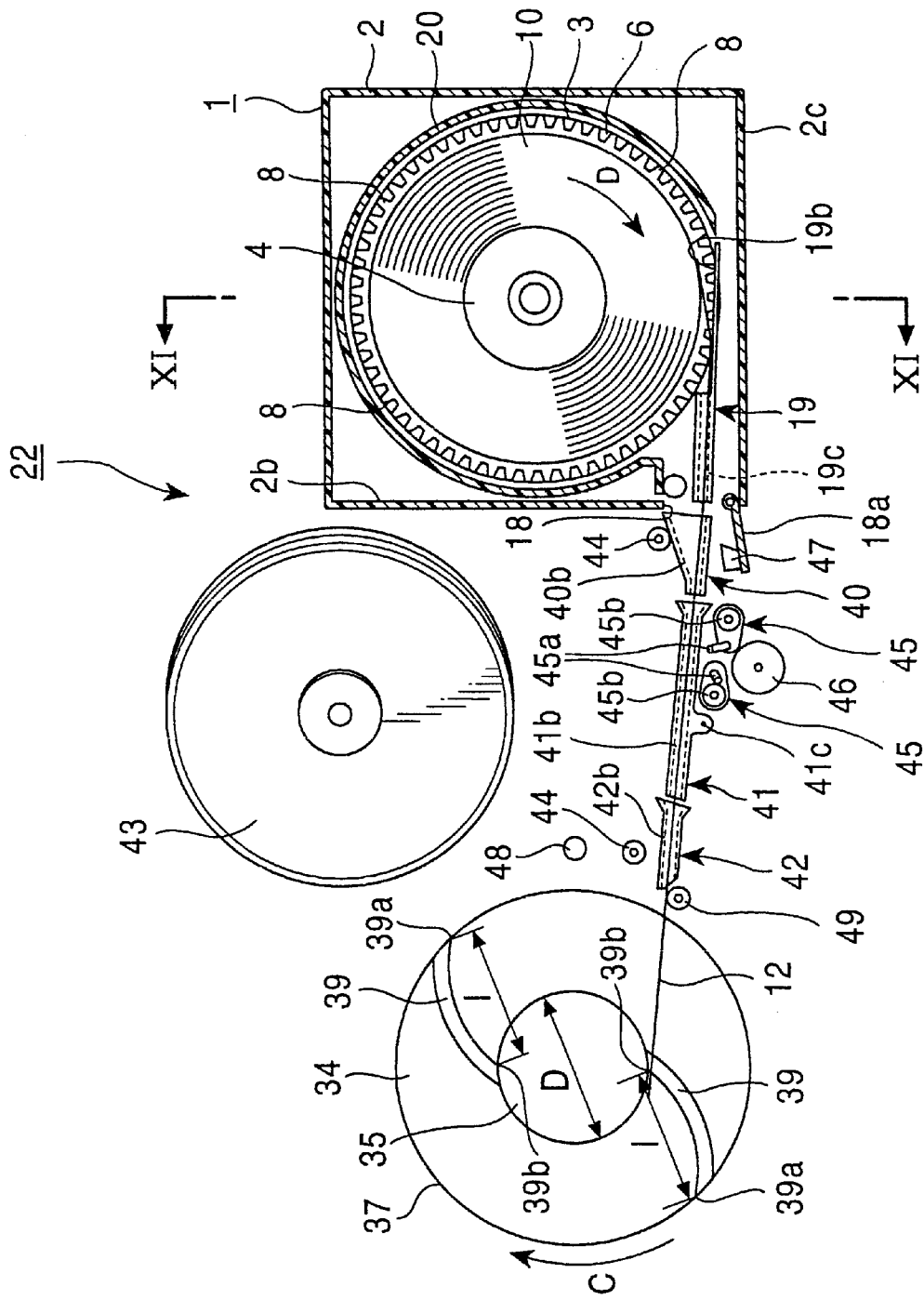
FIG. 10 is a schematic plan view of a state in which one end of the reading tape is stopped by a take-up reel.
Figure 11:
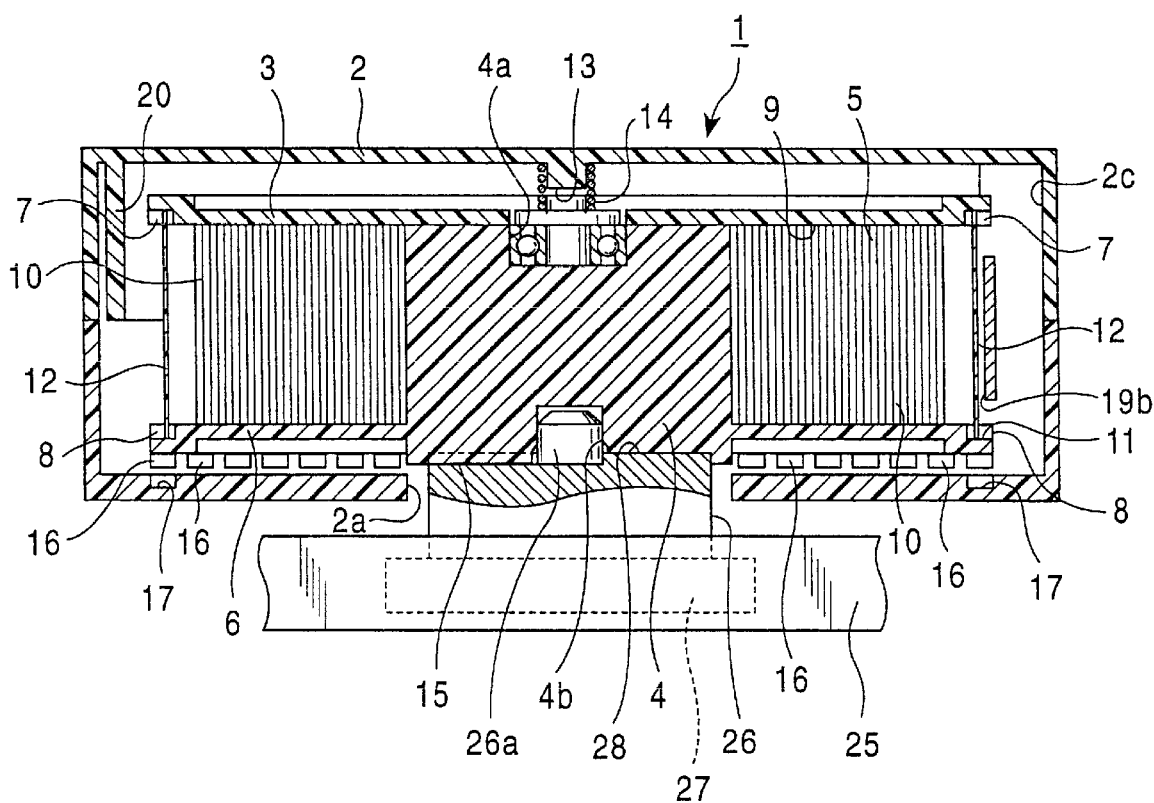
FIG. 11 is a sectional view taken along line XI—XI of FIG. 10.

As shown in FIG. 10, a lid opening-and-closing member 47 is disposed near the cassette-mounting portion 24.

A capstan 48 is disposed between the stationary tape guide 44 disposed near the take-up reel 34, and the head drum 43.

A stationary tape guide 49 for a leader tape 12 is disposed near a take-up reel 34 side end of the back surface of the leader tape guide 42.

Recording and reproducing operations using the above-described one-reel tape cassette 1 is carried out as follows.

When the one-reel cassette 1 is not in a mounted state, the slide cams 29 and 29 are positioned at the end-of-movement locations in the direction of arrow B of FIG. 8, so that the reel table base 25 is at its lowest end of its range of movement, reached when the engaging pins that are not shown engage the lower horizontal portions 30b defining the cam slits 30 of the slide cams 29 and 29. When the one-reel tape cassette 1 is inserted into the recording/reproducing apparatus 22 from the cassette insertion-and-removal opening 23, the raising-and-lowering motor 31 is driven to move the slide cams 29 and 29 in the direction of arrow A, causing the reel table base 25 to be raised. When the slide cams 29 and 29 at end-of-movement locations in the direction of arrow A, the reel table base 25 arrives at its highest end of its range of movement, reached when the engaging pins that are not shown engage the upper horizontal portions 30c of the cam slits 30.

When the reel table base 25 reaches its highest end of its range of movement, the reel table 26 is inserted into the cartridge 2 from the reel-table insertion opening 2a, the tape reel 3 is raised slightly in the cartridge 2 to unlock it as mentioned above, and the engaging protruding linear portions 28 on the reel table 26 and the engaging protruding linear portions 15 of the tape reel 3 are brought into engagement. During this time, the lid 18a is rotated to its open position by the lid opening-and-closing member 47 in order to uncover the tape draw-out opening 18.

Then, the reel table motor 27 is driven to rotate the tape reel 3 through the reel table 26 in a direction in which the tape is fed, that is, in the direction of arrow D in FIG. 10.

When the reel table 3 rotates in the direction of arrow D, the feed teeth 7 and 8 cause the toothed portions 12b to be fed, so that the leader tape 12 is subjected to a force acting in a direction in which it is paid out from the cartridge 2, and is paid out from the tape draw-out opening 18 in the cartridge 2.

Means for feeding the leader tape 12 from the cartridge 2 is not limited to that constructed by the toothed portions 12b and the feed teeth 7 and 8. Therefore, other types of means may be used, such as a means including a plurality of holes formed in the leader tape in a lengthwise direction thereof and protrusions formed in the tape reel for engagement with the holes.

When the leader tape 12 is paid out from the cartridge 2, the leader tape 12 is successively guided by the leader tape guides 40, 41, and 42, and moved towards the take-up reel 34. When the end portion 12 of the leader tape 12 arrives at a location between the flanges 36 and 37 of the take-up reel 34, the arrival of the end portion 12 is detected by a detecting means that is not shown (which may comprise, for example, a reflecting sensor and a hole formed in the leader tape 12) to stop the feeding of the leader tape 12, and the take-up reel 34 starts to rotate in the direction of arrow C in FIG. 10.

Figure 12:
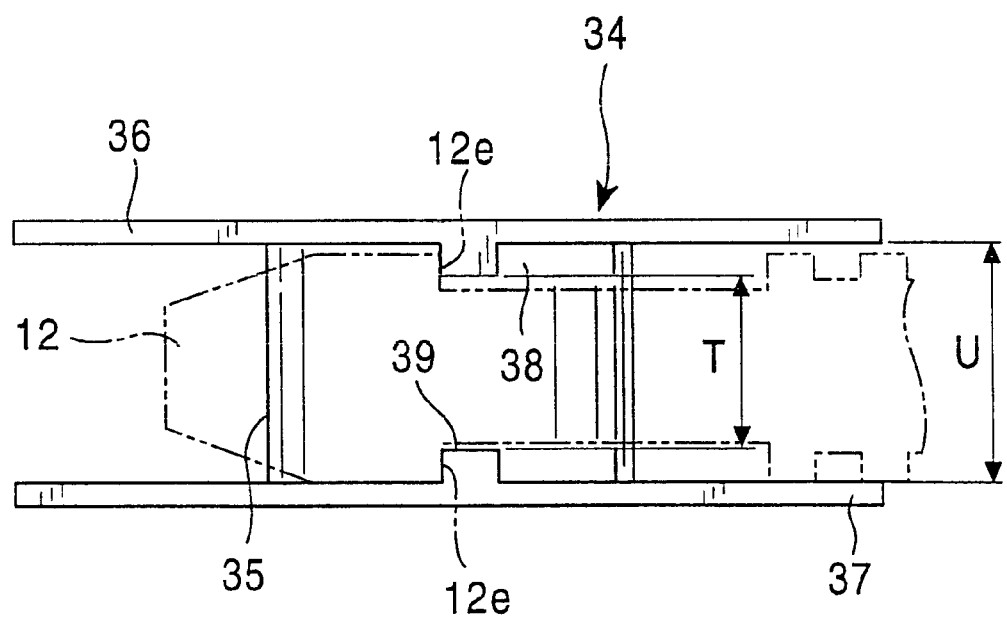
FIG. 12 is a side view of the take-up reel.

Then, as shown in FIG. 12, the engaging edges 12e and 12e of the leader tape 12 are caught by the ends 38a and 39a of the pair of hooks 38 and 39 of the take-up reel 34, and the rotation of the take-up reel 34 in the direction of arrow C brings the end portion 12c of the leader tape 12 into engagement with the base portions 38b and 39b of the hooks 38 and 39. The leader tape 12 is subjected to a take-up force by the rotation of the take-up reel 34, and is taken up by the hub 35 thereof. Here, since the lengths l, L', and L are set as described above, the toothed portions 12b do not cushion the hooks 38, 38, 39, and 39 of the take-up reel 34.

Figure 16:
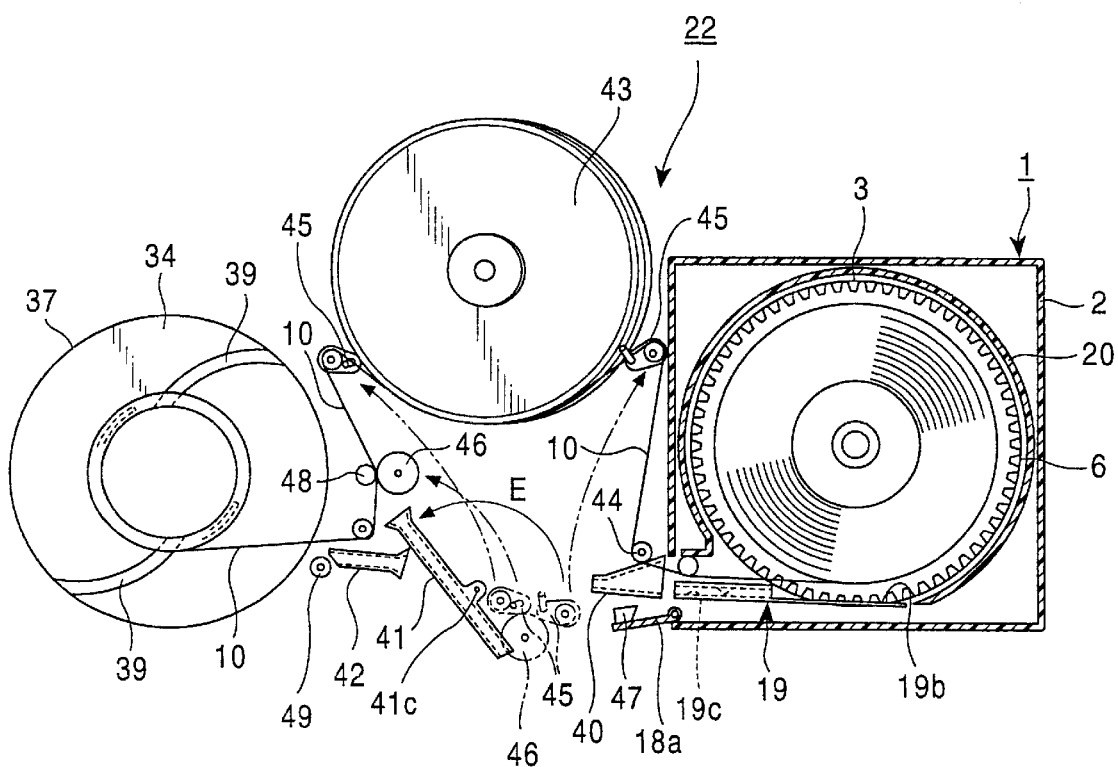
FIG. 16 is a schematic plan view of a state in which the tape path is formed.

When the take-up reel 34 performs take-up operations to draw out the tape 10 to a location near the take-up reel 34, the intermediate tape guide 41 rotates counterclockwise, that is, in the direction of arrow E, and the portion of the intermediate tape guide 41 where the cutout portion 41d is formed is moved out from the location between the draw-out guides 45 and 45 as well as the pinch roller 46 and the head drum 43 (see FIG. 16). Since the cutout portion 41d is formed, the intermediate tape guide 41 does not cushion the tape 10 during the aforementioned rotation of the intermediate tape guide 41.

When the intermediate tape guide 41 rotates as described above, the draw-out guides 45 and 45 and the pinch roller 46 move as indicated by respective dotted arrows in FIG. 16, and the draw-out guides 45 and 45 draw out the tape 10 to wind it onto the head drum 43. The tape 10 is pinched by the pinch roller 46 to press-contact it against the capstan 48.

Then, the tape 10 is made to run at a constant speed by the pinch roller 46 and the capstan 48, and taken up by the take-up reel 34, during which the rotary head that is not shown provided at the head drum 43 helically scans the tape 10 in order to write (record) data or read (reproduce) data onto or from the tape 10.

The running of the tape 10 at constant speed does not have to be achieved by a pinch roller and a capstan, so that it may be achieved by, for example, tape tension control of a drive motor (not shown) for the take-up reel 34.

Figure 13:
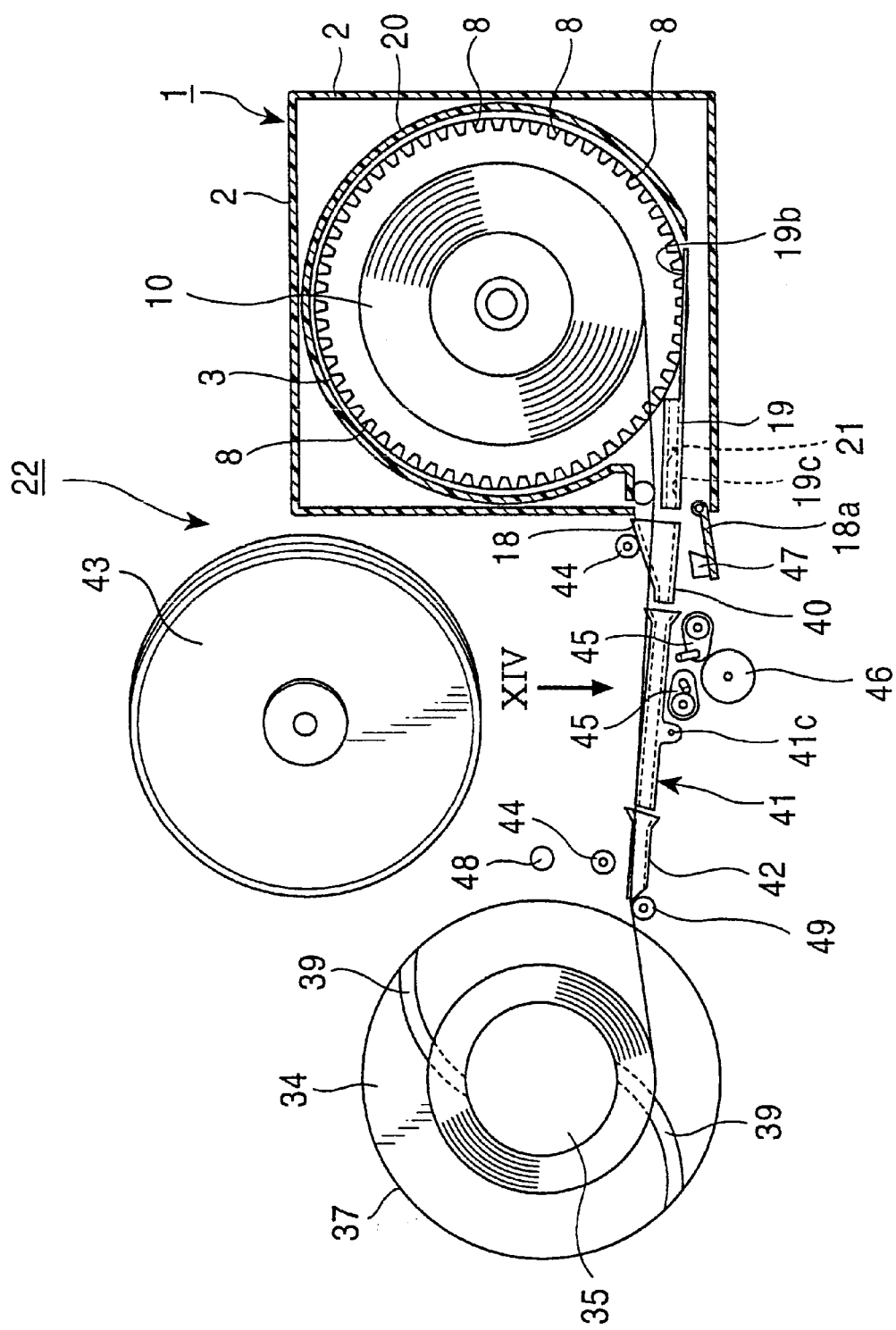
FIG. 13 is a schematic plan view of a state in which the reading tape has been taken up by the take-up reel.
Figure 14:
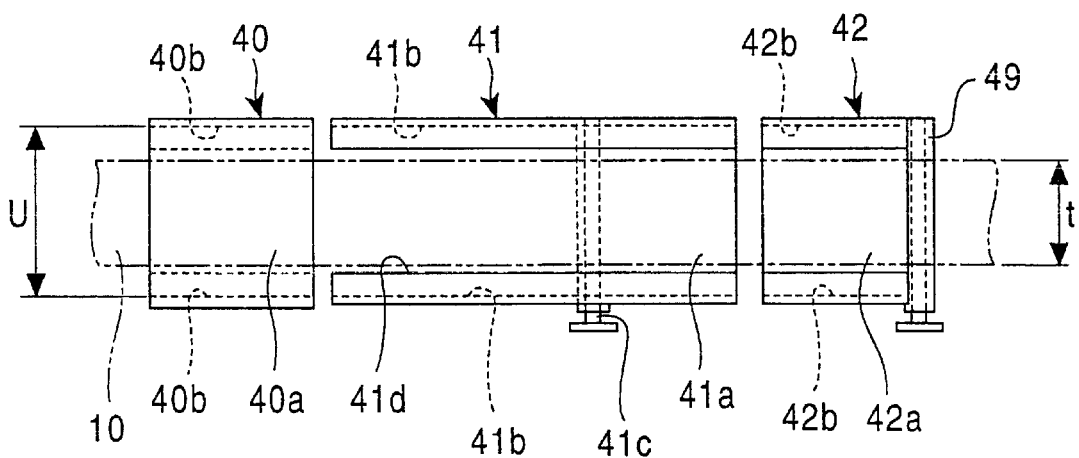
FIG. 14 illustrates a portion indicated by arrow XIV of FIG. 13.
Figure 15:
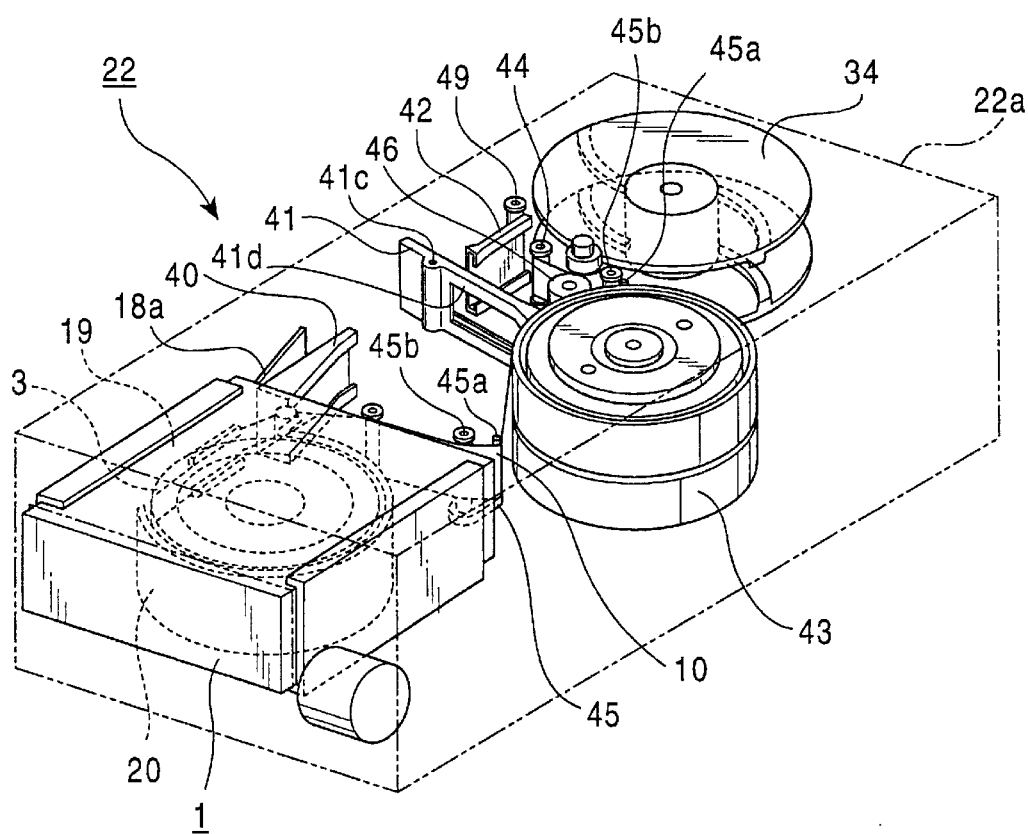
FIG. 15 is a schematic perspective view of a state in which a tape path is formed.

When the tape 10 is run at a high speed, that is, when it is subjected to FF (fast feeding) operations or REW (rewinding) operations, damage to the tape 10 is kept to a minimum because the tape 10 is in a state shown in FIG. 13, that is, it is separated from the head drum 43, the stationary tape guides 44 and 44, the draw-out guides 45 and 45, the pinch roller 46, and the capstan 48; and a substantially linear path is formed from the tape reel 3 to the take-up reel 34.

When writing (recording) or reading (reproducing) of data onto or from the tape 10 is completed, the draw-out guides 45 and 45 and the pinch roller 46 return to their original positions (see FIG. 13), and the intermediate tape guide 41 rotates clockwise, that is, in a direction opposite to the direction of arrow E in order to align itself with the leader tape guides 40 and 42.

Then, the tape reel 3 rotates in a direction opposite to the direction in which the tape is taken up, that is, in a direction opposite to the direction of arrow D in FIG. 10 in order to take up the tape 10. Accordingly, the tape 10 is taken up by the tape take-up portion 9 of the tape reel 3.

When the tape 10 is completely taken up by the tape take-up portion 9, the leader tape 12 is taken up by the leader-tape take-up portion 11 while the toothed portions 12b engage the feed teeth 7 and 8.

The take-up operation by the tape reel 3 is slowed down at the time the end portion 12c of the leader tape 12d disengages the take-up reel 34, and a torque controlling operation is performed just in front of the location where the end portion 12c just about enters the cartridge 2.

At the last stage, the stopper hole 12a in the leader tape 12 is stopped by the stopping surface 21a of the stopper 21 of the tape guide 19, whereby the taking up of the tapes 10 and 12 is completed. When the take-up operation torque controlling operation is performed by the tape reel 3, engagement of the stopper 21 and the stopping hole 12a is ensured.

By accident, the stopping hole 12a may not be stopped by the stopper 21. In that case, the leader tape 12 is wound into the cartridge 2b beyond its predetermined location. Even in the case where this occurs, when the tape reel 3 is rotated in the direction of arrow D, the toothed portions 12b of the leader tape 12 can be fed by the feed teeth 7 and 8 of the tape reel 3, so that the leader tape 12 gets pushed against the leader tape guide wall 20. It is then subjected to a force acting in a direction in which the tape is sent out by the resiliency thereof, and is moved in the direction in which the tape is sent out. While the end portion 12c is being press-contacted against the tape press-contacting surface 19b of the tape guide 19, the top and bottom side edges thereof are brought into engagement with the recessed linear guide portions 19c and 19c, whereby the leader tape 12 is reliably sent out from the cartridge 2.

When an eject button that is not shown is pressed, the lid 18a is closed to cover the tape draw-out opening 18, and then the one-reel tape cassette 1 is ejected from the cassette insertion-and-removal opening 23.

In the above-described one-reel tape cassette 1, the leader tape 12 can be sent out only by the rotational driving force of the table reel 3, so that its structure becomes much simpler than the conventional type in which a draw-out tape is sent out from the take-up side to draw out the leader tape 12.

Even when the stopping hole 12a in the leader tape 12 and the stopper 21 of the tape guide 19 are disengaged from each other, the tape reel 3 can be rotated in the direction in which the tape is sent out to move the end portion 12c of the leader tape 12 along the leader tape guide wall 20, provided so as to surround almost the entire periphery of the tape reel 3, in order to reliably make the top and bottom side edges thereof enter their respective recessed linear guide portions 19c and 19c of the tape guide 19.

In the above-described recording/reproducing apparatus 22, the tape reel 3 of the one-reel tape cassette 1, mounted to the recording/reproducing apparatus 22, and the take-up reel 34 of the recording/reproducing apparatus 22 are disposed at the same height; and after the leader tape 12 is wound onto the wind-up reel 34, the draw-out guides 45 and 45 and the pinch roller 46 are moved in order to form a tape path. Therefore, the path formed from the tape reel 3 to the take-up reel 34 to send out the leader tape 12 can be formed substantially on a straight line, making it possible to simplify the structure for sending out the leader tape 12. In addition, since the sending-out path is like a straight line, the feeding load on the leader tape 12 is small, and it is not easily affected by changes in the rigidity of the leader tape 12 even at low temperatures.

The end portion 12c of the leader tape 12 is formed into a shape that allows the leader tape 12 to be automatically taken up by the take-up reel 34 as a result of rotation of the take-up reel 34, allowing tape loading to be carried out simply and reliably.

The intermediate tape guide 41 is made rotatable, and a cutout 41d is formed for allowing the tape 10 to escape; and after the leader tape 12 has been taken up by the take-up reel 34, the intermediate tape guide 41 is rotated, and the draw-out guides 45 and 45 and the pinch roller 46, disposed at the back side thereof, are moved to form a path for the tape 10. Therefore, the leader tape 12 does not come into contact with the head drum 43, the rotary head, the stationary tape guides 44, the draw-out guides 45 and 45, the pinch roller 46, the capstan 48, and other important component parts. Consequently, the leader tape 12 does not adversely affect the important component parts disposed along the path through which the tape 10 runs.

Although in the above-described recording/reproducing apparatus 22 a rotary head is used, a stationary head may be used instead.

The form and structure of each component part used in the above-described embodiment is only one example thereof for carrying out and embodying the present invention. Therefore, the aforementioned forms and structures are not to be construed as limiting the technical scope of the present invention.

As can be understood from the foregoing description, according to the present invention, there is provided a tape cassette comprising a cartridge; one tape reel provided in the cartridge, with a recording medium in the form of a tape being wound upon the tape reel; sliding restricting means, provided at the lower surface of the tape reel, for restricting sliding in a direction of a surface of the tape reel as a result of press-contacting the tape reel against the reel table; biasing means for biasing the tape reel in a direction in which the tape reel is press-contacted against the reel table; means for being locked (corresponding to the lock teeth 16 in the embodiment), formed in the lower surface of the tape reel; and locking means (corresponding to the lock recesses 17 in the embodiment), disposed at an inside bottom surface of the cartridge, for engaging the means for being locked. In the tape cassette, when the tape cartridge is not used, the means for being locked and the locking means are made to engage each other by the biasing means, and when the tape cartridge is used, the reel table is press-contacted against the sliding restricting means to cause the lower surface of the tape reel to separate from the inside bottom surface of the cartridge, whereby the means for being locked and the locking means are disengaged from each other.

In this case, the biasing means used as a member for transmitting power between the reel table and the tape reel when the tape cassette of the present invention is used can also be used as a member for locking the tape reel when it is not used. Therefore, the number of parts used can be reduced.

According to the present invention, the sliding restricting means may be an engaging protruding linear portion extending radially from the center portion of the lower surface of the tape reel. Therefore, transmission of power from the reel table to the tape reel can be ensured.

According to the present invention, the sliding restricting means may be a surface with a high coefficient of friction. Therefore, it can be easily provided.

What is claimed is:

1. A tape cassette comprising:

a cartridge; and one tape reel provided in the cartridge, with a recording medium in the form of a tape being wound upon the tape reel;

wherein a leader tape that is more rigid than the recording medium in the form of a tape is connected to an unwinding end of the recording medium in the form of a tape, and is sent out from the cartridge as a result of rotation of the tape reel in one direction; and wherein a leader tape guide wall attached to said cartridge is formed along substantially an entire circumferential periphery of the tape reel excluding a portion thereof located in correspondence with a tape draw-out opening so as to enclose at least a portion of the tape reel.

* * * * *